UNITED STATES PATENT OFFICE.

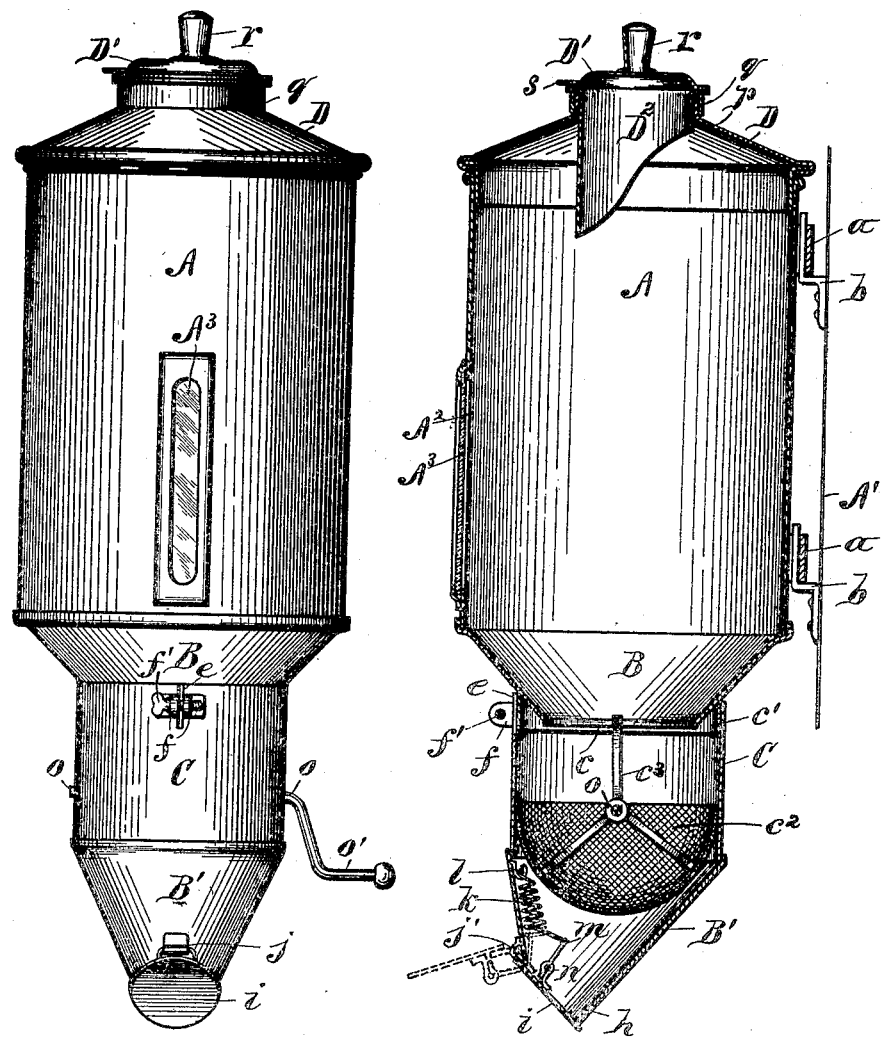

EUGENE H. VUILLEMOT AND HERMON E. VUILLEMOT, OF SYRACUSE, NEW YORK.

KITCHEN UTENSIL.

No. 818,063.

Specification of Letters Patent.

Patented April 17, 1906.

Application filed January 15, 1906. Serial No. 296,021.

*To all whom it may concern:*

Be it known that we, EUGENE H. VUILLEMOT and HERMON E. VUILLEMOT, residents of Syracuse, in the county of Onondaga, in the State of New York, have invented new and useful Improvements in Kitchen Utensils, of which the following, taken in connection with the accompanying drawings, is a full, clear, and exact description.

This invention relates to the class of household utensils which are designed to be supported on a wall or other convenient object for storing flour or similar substance which requires sifting.

The main object of the present invention is to produce a combined flour-storing receptacle and sifting device which shall be simple in its construction, very efficient in its use, and at the same time inexpensive to manufacture.

Other objects will be apparent by the novel arrangement and combination of the component parts of the utensil, hereinafter fully described, and set forth in the claims.

In the annexed drawings, Figure 1 is a front elevation of the utensil embodying our invention. Fig. 2 is a vertical section of the same; and Fig. 3 is a detail side view of the scoop, which is adapted to be used for filling the receptacle and may also be used as a receiver for the sifted flour or other material discharged from the utensil.

Similar letters of reference indicate corresponding parts.

A represents the receptacle for containing flour and which is preferably of cylindrical shape and may be composed of tin or other suitable metal. This receptacle is disposed in upright position and is provided with suitably-shaped pieces of tin or other metal (indicated at $a\ a$) by which it is supported on suitable brackets $b\ b$, attached to a wall or other object. (Represented at A'.) The front of the receptacle is provided with a vertical opening $A^2$, having a sight-glass $A^3$, thereby affording a view of the interior of the receptacle. The bottom portion of this receptacle is contracted to form a hopper, as indicated at B, which hopper is provided with a cylindrical sifting-chamber C, disposed concentric with the outlet-opening $c$ of the hopper and embracing a ring $c'$, secured to the exterior of the hopper. This sifting-chamber may be fastened to the ring of the hopper in any suitable manner which will permit its being readily removed and replaced when required. However, we prefer to slit the upper portion of the said chamber vertically, as shown at $e$, and provide the same with a pair of perforated ears $f f$, disposed at opposite sides of the slit, one of which ears has its perforations screw-threaded to receive a suitable thumb-screw $f'$, which is provided with a bearing against the other ear, whereby the two ears are drawn toward each other to cause the chamber to firmly clamp the aforesaid ring $c'$. By loosening this thumb-screw the chamber is relieved from its grip on the ring $c'$ to allow it to be removed. The lower portion of the sifting-chamber C is formed with a forwardly-inclined tapering spout B', having its discharge-opening $h$ provided with a lid $i$, which is hinged to the spout, as shown at $j$. This lid is held in both its closed and open positions by means of a coiled spring $k$, disposed upright within the spout, one end of which spring is connected to the upper portions of said spout, as indicated at $l$. The opposite end of said spring is bent to form an arm $m$, by which it is pivotally connected to an eye $n$, provided on the inner face of the lid. The lid being normally held in closed position by the spring prevents leakage of the flour from the spout.

Within the chamber C is disposed the sifting device, which may be of any suitable form, but preferably consists of the usual sieve $c^2$, fastened to the chamber, and the agitator $c^3$, secured to a transverse shaft $o$, journaled in the chamber and provided with a handle $o'$ for rotating the same.

D denotes a removable cover applied to the top of the receptacle and which is preferably deflected upwardly and formed with a central annular opening $p$, surrounded by an upwardly-projecting flange $q$, formed on the cover.

D' represents a removable cap which is seated on the flange $q$ and is formed with a depending scoop $D^2$, fitted to the opening and provided with an upwardly-projecting handle $r$. It is obvious that this scoop may be used for filling the receptacle with flour, or it may be used as a receiver for the sifted flour discharged from the spout B'.

What we claim is—

1. A utensil of the class specified, comprising a cylindrical receptacle provided on its bottom with a hopper, a cylindrical chamber having its upper portion slitted vertically and embracing the hopper and provided with ears at opposite sides of the slit and means for drawing said ears toward each other for clamping the chamber to said hopper, a sieve and agitator in said chamber, a forwardly-inclined tapering discharge-spout fastened to said chamber, a lid hinged to the end of the spout, and a coiled spring disposed substantially upright within the discharge-spout and having its upper end fastened thereto and its lower end formed with an arm pivotally connected to the lid as and for the purpose set forth.

2. A utensil of the class specified comprising an upright cylindrical receptacle formed at its bottom with a hopper provided on its lower portion with an external ring, a cylindrical sifting-chamber provided with means for clamping it detachably to said ring, a sieve and a rotary agitator supported within said chamber, a discharge-spout on the bottom of said chamber, a lid hinged to the end of the discharge-spout, and a coiled spring disposed within the spout and serving to retain the lid in both closed and opened positions as set forth

EUGENE H. VUILLEMOT. [L. S.]
HERMON E. VUILLEMOT. [L. S.]

Witnesses:
J. J. LAASS,
L. H. FULMER.